United States Patent Office 3,698,874
Patented Oct. 17, 1972

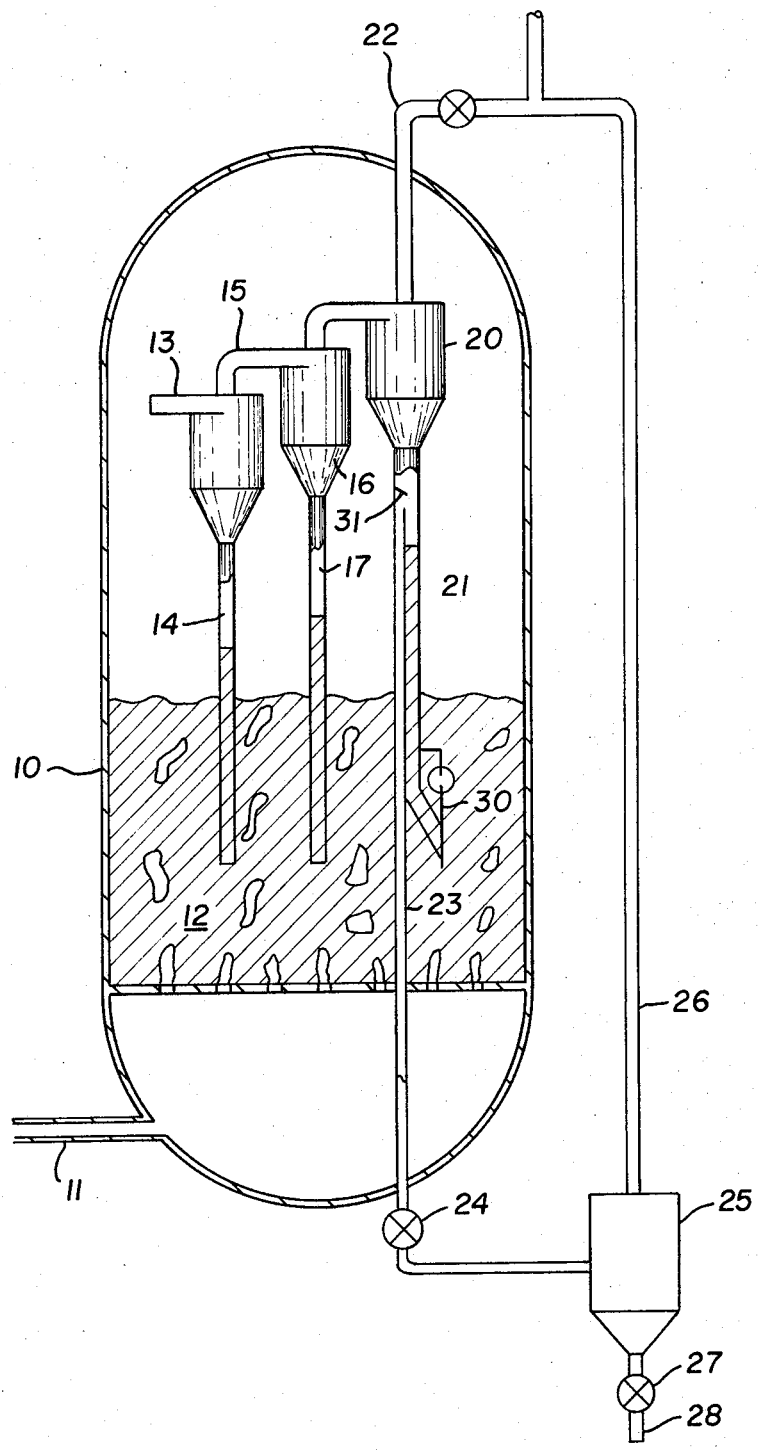

3,698,874
DUST CONTROL APPARATUS FOR
FLUIDIZED BED REACTORS
Frederick A. Zenz, Bryant Ave.,
Roslyn Harbor, N.Y. 11576
Filed July 23, 1970, Ser. No. 57,614
Int. Cl. B01d 45/12; B01j 9/18; B04c 5/30
U.S. Cl. 23—284
9 Claims

ABSTRACT OF THE DISCLOSURE

An improved system for reducing dust emission to the atmosphere from a fluidized bed reactor. The system employs cyclone separators one of which, in addition to returning separated particles to the bed through a dip-leg, is provided with means for bypassing a small part of the gas stream to a filtering system. The system reduces dust emission by subjecting part of the gas stream carrying non-separable particles as an underflow stream to a filtering operation while returning separated fines to the fluid bed.

---

The object of this invention is to provide an improved means for controlling the removal of very fine particles entrained during normal fluidized bed reactor processes. In effecting such control, the aim is not to interfere with normal bed operation, but rather to remove the fines either independently or in conjunction with other means that control the make-up of the particle size in the bed. The ultimate purpose of such control of the fines is to minimize the emission thereof to the environment and thus provide an effective pollution control while minimizing the need for feeding make-up material to maintain bed inventory.

In a conventional fluid bed reactor gases pass upwardly through the particles-form bed at velocities sufficient to entrain or carry off particles from the bed surface. The gases thus start through the system as a dust laden stream. To remove the entrianed particles there are usually provided, often within the reactor vessel itself, one or more contrifugal separators, or cyclones. The cyclones may be arranged in a serial or parallel configuration but in either case the separated particles are returned to the fluid bed by means of a dip-leg protruding into the bed.

The efficiency of cyclone separators is a function of many variables among which particle size and entrance velocity predominate. The smaller the particles, the more readily they follow the gas streamlines and the more difficult they are to separate from the gas stream. Those finest particles which cannot be removed by cycloning leave the reactor vessel and are emitted to the atmosphere or if the emission rate is excessive are subjected to further costly collection processes external to the reactor. Such additional collection processes may involve, by way of example, scrubbers or electrical precipitators.

Increasing the efficiency of internal cyclones, that is their ability to separate even finer particles, by imparting higher inlet velocities to the gases entering the cyclone is at the expense of greater pressure losses and taller reaction vessels. Moreover, the increased gas velocity creates additional fine particles due to attrition as the entrained particles carried in the high velocity inlet gas stream impinge against the wall of the cyclone separator. In any event it is obvious that if the cyclone collectors are not 100% efficient, fines must be leaving the vessel and since this would lead to a grandual loss of solids inventory in the fluid bed this loss must be replaced with fresh solids. While one would expect the active catalyst surface area of the bed to decrease to the detriment of reactor performance due to the replacement of fines by larger bed particles, this is not found to be the case in practice. Rather, the particles size within the bed decreases despite some amount of fine particle loss. This must mean that particle attrition, or fragmenting, occurs in the cyclones to a significant but unavoidable extent. The resulting increase in fines content of the bed leads to increased fines entrainment in the gas leaving the bed and hence to increased dust content in the gases leaving the reactor vesel.

For a particular operating system, there results a balance between the forces of attrition and centrifiugal separation leading to an equilibrium between rate of dust loss from the vessel and particle size distribution of the fluidized solids mass. This equilibrium is difficult to control since it varies with the design of the cyclone separators, the reactor operating conditions and the size distribution of the makeup catalyst, but in every instance it exists in conjunction with an equilibrated loss rate of fines. Since the loss rate might well be excessive, it would be desirable to control it without any additional external devices or at least with a minimum of such devices. It would also be desirable to effect such control independent of reactor operating conditions, makeup catalyst size distribution or minor changes in cyclone system efficiency which can occur as a result of wear, warpage, or even plugging over the course of several years operation.

Since it is impossible to alter the physical dimensions of reactor vessels once installed and since makeup catalyst size distribution may also not be available in an infinite variety of particle size distributions, the only control on reactor equilibrium between optimum particle size of the bed and minimum dust loss must depend primarily on contralilng the removal of fines from the system.

If all of the fines removed from the gas stream are returned to the fluidized bed as in conventional systems by way of dip-legs from the cyclone of the separation apparatus, the bed would, due to attrition of the particles as they strike the cyclone walls, eventually contain an excess of fine particles with a resulting disturbance of the equilibrium. Also there would be an increasing loss of dust to the atmosphere because the cyclones are less effective in collecting and separating fine as compared to coarse particles.

If, on the other hand to control dust emission from the system, all of the fines collected in say the last cyclone stage are removed from the system as by the dip-leg from that cyclone exiting from the reactor vessel and the periodic removal of fines collecting therein being controlled by a valve, the loss of this fine catalyst would have to be replaced from a makeup supply. The coarser fresh makeup needed to maintain bed inventory would result in a gradual shift towards a coarser bed size distribution which at a fixed fines removal rate would reach a new and more desirable dust loss rate. However, it might take several days or weeks for the inventory of the fluid bed to alter in particle size distribution with the consequence that there is a long time lag in modifying the dust loss rate. Or in other words, it might take several days to reduce emission of dust to the atmosphere to a satisfactory level.

It has also been suggested, instead of collecting fines in the dip-leg of the last cyclone in the separating apparatus and periodically removing the collected fines, rather that a small quantity of gas normally exiting from the cyclone be diverted down its dip-leg to carry separated solids down the dip-leg and out of the reactor vessel into an external collection vessel. This vessel can be an absolute filter to remove all particles from the diverted gas stream. The thus filtered gas can if desired be merged with the main stream leaving the cyclone separating system. This arrangement obviously accomplishes removal of fines and hence circumvents their accumulations in the fluidized bed as in the first prior art system referred to above. The arrangement also increases the particle separation efficiency of the last cyclone stage by its ability to remove more of the particles entering the cyclone. Hence, the arrangement permits a rapid responsive control of dust emission from the cyclone to the atmosphere and overcomes the time delay limitation of the second prior art configuration refered to above. Nevertheless, it does suffer the disadvantage of removing from the system all fines collected in the last cyclone stage.

As stated previously, it is an object of this invention to provide, in a fluidized bed reactor, an apparatus for significantly reducing dust emission to the atmosphere from such reactors while at the same time substantially maintaining the equilibrium of the fluid bed.

It is a further object of the invention to provide an apparatus that permits reducing the dust emission from a a fluidized bed reactor while minimizing the need for makeup catalyst to maintain bed inventory.

It is still another object of the invention to provide an apparatus that permits rapid control of the dust emission rate while returning a substantial portion of separated fines to the fluidized bed.

In carrying out the invention, a cyclone separator is provided for use with a fluidized bed reactor to separate fines entrained in the gases passing upwardly through the fluidized bed. The cyclone separator is provided with a dip-leg that returns separated fines to the fluidized bed and a by-pass duct that permits a portion of the gases carrying nonseparable fines to leave the cyclone as an underflow stream and be diverted to additional processing or filtering apparatus. The diverted gas stream, after being subjected to the filtering operation, can be merged with the main gas stream from the cyclone.

Features and advantages of the invention may be gained from the foregoing and from the description of preferred embodiment that follows.

In the sole figure of the drawing a fluidized bed reactor embodying the invention is schematically shown.

The invention will be described in conjunction with a catalyst regenerator, but it is to be understood that it may equally well be used in other fluid bed reactors. Referring now to the drawing, a gas stream enters the reactor vessel 10 through an inlet pipe 11 and passes up through a particulate bed 12 which is thereby fluidized. In passing through the bed the gas stream entrains small particles from the bed surface with the result that the gas enters the first stage cyclone 13 as a dust laden stream. The coarser particles are separated from the gas stream in the cyclone and are returned to the fluidized bed through dip-leg 14.

Those particles that are not separated in cyclone 13 are carried by the gas stream lines through duct 15 to the second stage cyclone 16 where they are subject to more intensive centrifugal forces. This accomplishes separation of still finer particles which are returned to bed 12 through dip-leg 17. Those particles which are not separated in cyclone 16 are carried by the gas to a third cyclone 20 where further separation takes place. Here again those particles where are separated are returned to the fluidized bed 12 through dip-leg 21 while those particles still entrained in the gas stream are exhausted to the atmosphere through stack 22. In the present example a three stage cyclone separator is described and shown, although fewer or more stages may be employed. In fact, the present invention could be used in a single cyclone system.

In any case, the last stage of the cyclone system is provided with a separate duct 23 which exits from reactor vessel 10 and through valve 24 goes to an additional separation apparatus 25. Since, as will be described, only a small portion of the gas stream leaving vessel 10 will pass through duct 23, separation apparatus 25 may be an absolute filter that removes all particles carried by the gas through duct 23. The filtered gas leaves apparatus 25 through pipe 26 to merge with the dust entrained gas in stack 22. It will be clear that the merged gas will contain less dust than if a portion of the gas did not pass through apparatus 25. The fines filtered out by apparatus 25 are collected and drawn off periodically through valve 27 and pipe 28.

Duct 23 must exit from the cyclone below the cone of the cyclone so that the gas entering the duct does so as an underflow stream. Such a stream increases the efficiency of the cyclone by carrying a higher percentage of non-separable particles than would be carried by a comparable stream exiting normally from the cyclone. In the preferred embodiment, the underflow gas stream will be from 1% to 5% of the gas stream entering the cyclone, but in no event should it be more than 10% of the gas stream, otherwise the requirements for filtering apparatus 25 might increase the costs of the system to an uneconomic level.

Duct 23 must terminate at its upper extremity at or preferably some distance above the level the separated particles would normally reach in dip-leg 21. This level is determined by the bulk density of the particles and the difference in pressure within the bed at the foot of the dip-leg 21 and the pressure at the junction of dip-leg 21 with the cone of the cyclone. A trickle valve 30 may be provided at the foot of dip-leg 21. It may also be necessary to provide a baffle or coarse screen 31 above duct 23 to prevent plugging of the duct by material that might flake or spall off the interior surface of cyclone 20.

While duct 23 has been shown adjacent dip-leg 21 and passing through the grid plate of vessel 10, it could exit from the vessel either through the sidewall or the top of the vessel. Also while a serial arrangement of cyclones has been shown, they could be arranged in a parallel configuration or a series parallel configuration. In certain of the parallel configurations where a number of ducts, similar in purpose to duct 23, are provided, those ducts could lead to a header from which a single duct will lead to the exterior of vessel 10 and to separation apparatus 25. The header may be located above or below the fluidized bed.

While many variations have been suggested to the preferred embodiment disclosed, it is to be understood that still other variations or apparent different embodiments may be apparent which will not depart from the spirit and scope of the invention. Therefore, it is intended that the foregoing description and the drawing be interpreted in an illustrative rather than in a limiting sense.

What is claimed is:

1. For use with a fludized bed reactor, a system for separating bed particles entrained in a gaseous stream, said system including a cyclone having a dip-leg extending into the bed for returning separated particles to the bed, a stack for exhausing the gaseous stream carrying nonseparable particles from the cyclone to the atmosphere, additional particle separating means and separate duct means exiting from the cyclone at a point that will enable a part of the gaseous stream entering the cyclone to leave the cylone as an underflow stream, said separate duct means leading to said additional particle separation means.

2. A cyclone system according to claim 1 including valve means for controlling the flow of the gas stream through the separate duct means.

3. A cyclone system according to claim 1 wherein said additional particle separation means is an absolute filter.

4. A cyclone system according to claim 1 wherein the separate duct means exits from the cyclone below the cone of the cyclone.

5. A cyclone system according to claim 1 including a second cyclone operating in parallel with the cyclone and having a dip-leg extending into the bed for returning separated particles to the bed, and additional duct means exiting from said second cyclone at a point that will enable a part of the gaseous stream entering said second cyclone to leave said second cyclone as an underflow stream, said additional duct means leading to the additional particle separation means.

6. A cyclone system according to claim 1 wherein said separate duct means carries, between ½% and 10% of the gas stream entering the cyclone.

7. A cyclone system according to claim 6 wherein said separate duct means carries from 1% to 5% of the gas stream entering the cyclone.

8. The method of controlling the dust emission to the atmosphere from a fluidized bed reactor which comprises the steps of, causing the gaseous stream to pass through a cyclone which returns separated particles to the fluidized bed through a dip-leg and exhausts the gaseous stream and non-separable particles entrained therein to the atmosphere, drawing off a portion of the gaseous stream having entrained non-separable particles in an underflow stream, and passing said drawn-off gas stream to an absolute filter means.

9. The method according to claim 8 including the step of controlling the flow of the gas stream to the absolute filter means whereby a gas stream is drawn from the cyclone in an underflow stream only when the non-separable particles entrained in the gaseous stream otherwise exhausted to the atmosphere exceeds a predetermined level.

References Cited
UNITED STATES PATENTS

| | | | |
|---|---|---|---|
| 2,400,645 | 5/1946 | Huff | 55—466 X |
| 2,535,140 | 12/1950 | Kassel | 23—288 S |
| 2,886,419 | 5/1959 | Orr | 23—288 S |
| 2,934,494 | 4/1960 | Kleiber | 55—345 X |
| 2,966,232 | 12/1960 | Austin | 55—315 X |
| 3,247,651 | 4/1966 | Hutchings | 55—345 |
| 3,333,402 | 8/1967 | Kalen | 55—345 |

MORRIS O. WOLK, Primary Examiner

S. MARANTZ, Assistant Examiner

U.S. Cl. X.R.

23—288 S; 55—97, 349, 432, 461